March 25, 1952

N. N. STEPHANOFF 2,590,220

APPARATUS FOR TREATING MATERIALS
IN SUSPENSION IN ELASTIC FLUID

Filed Feb. 17, 1948

INVENTOR.
NICHOLAS N. STEPHANOFF
BY
ATTORNEYS

Fig. 2.

_Fig. 11._

_Fig. 12._

INVENTOR.
NICHOLAS N. STEPHANOFF
BY Busser & Harding
ATTORNEYS

March 25, 1952

N. N. STEPHANOFF 2,590,220

APPARATUS FOR TREATING MATERIALS
IN SUSPENSION IN ELASTIC FLUID

Filed Feb. 17, 1948

INVENTOR.
NICHOLAS N. STEPHANOFF
BY
ATTORNEYS

Patented Mar. 25, 1952

2,590,220

UNITED STATES PATENT OFFICE 2,590,220

APPARATUS FOR TREATING MATERIALS IN SUSPENSION IN ELASTIC FLUID

Nicholas N. Stephanoff, Bryn Mawr, Pa., assignor to C. H. Wheeler Manufacturing Company, Philadelphia, Pa., a corporation of Pennsylvania Application February 17, 1948, Serial No. 8,887

13 Claims. (Cl. 241—39)

This invention relates to improvements in mills employed in the comminution of materials, drying of materials, the effecting of reactions between materials, and the like, in which the materials are suspended in elastic fluid, impelled by the action of elastic fluid jets emerging from nozzles.

The main flow chambers of such mills have generally been constructed of sections having circular cross sections such as shown in my prior Patents 2,237,091, issued April 1, 1941, and 2,325,080, issued July 27, 1943, and in my pending applications Serial No. 460,401, filed October 1, 1942, which has now matured into Patent No. 2,460,546, Serial No. 547,942, filed August 3, 1944, now abandoned, and Serial No. 599,690, filed June 15, 1945. The grinding and classifying chambers were normally made of tube turns and thus had uniform cross sections.

The disadvantages of this type of construction are numerous. For example, when a less than normal quantity of material is being circulated in the mill, the material is not well concentrated near the nozzles by centrifugal force. On the contrary it is dispersed through quite a large region. This decreases the efficiency of the mill when it is comminuting a small quantity of circulating material due to the failure of the material to be sufficiently concentrated in the most effective region of the jets.

Another disadvantage is that, when De Laval smooth flow type nozzles are used for grinding, the circulating material fails to load up the jets satisfactorily even when a normal quantity of material is being circulated.

It is, of course, possible to construct a mill having a small cross section where it is only used to process small quantities of circulating material. However, since it is very desirable to have a mill which is efficient in processing a wide range of quantities of circulating material, the expedient of constructing various sizes of mills to achieve maximum efficiency in handling such variable quantities of material is very unsatisfactory.

A further disadvantage is that a grinding chamber having a uniform cross section does not properly accommodate the inflowing gas from the nozzles. As the circulating material progressively passes the nozzles, the increasing volume of gas crowds the material to the side surfaces of the mill irrespective of the location of the nozzles which results in rapid wearing in these areas.

In addition, when the classifying section of the mill is constructed with a tube turn and thus has a uniform circular cross section, rapid abrasion occurs in the area where the direction of flow of the circulating material is first changed due to the effect of the momentum of the material particles which forces them against the outer surface of the classifying section.

This wear is particularly serious in the type of mill where the flow of material is accelerated by decreasing the stack area in the mill just prior to the point where the material enters the tube turn classifier. When this acceleration occurs, the large particles lag behind the gas and impact on the surface of the tube turn where their direction is suddenly changed. This lagging material also has a tendency to bunch up which detracts from the efficiency of the classifier in stratifying the particles.

Further an appreciable percentage of particles which are unacceptably large are exhausted from the mill due to the fact that the mill classifier section is not capable of classifying the particles so efficiently that no oversize particles will be exhausted. This percentage is large where material having a low specific gravity, such as cork, is being treated since the classifier depends on the mass of the particles for its operation. Thus when the particles exhausted from the mill are led to a separator, the oversize particles will be rejected there. These rejected particles by a separate operation must be collected and fed into the mill to be further treated.

Another problem encountered with mills of the type involved here is the time lost incident to cleaning out the mill. Cleaning is necessitated by the adherence of material to the interior walls of the mill.

The broad object of this invention is therefore to overcome the above mentioned objections as well as others which will be made apparent.

An object of this invention is to provide a mill having a grinding or comminuting chamber in which the material being treated, irrespective of quantity, is concentrated sufficiently in the jet region so as to fully load up the jets and permit them to work at maximum efficiency.

Another object of this invention is to provide a mill having a grinding or comminuting chamber section which will properly accommodate inflowing gases so as to reduce wear of the interior surfaces of the chamber.

A further object of this invention is to provide a mill having a classifier section which will accelerate and classify material with reduced resultant wear of the classifier and superior stratification of the material being treated.

An additional object of this invention is to provide a mill having a classifier section which has a large cross sectional area to accommodate large particles of material and a smaller cross sectional area to accommodate smaller particles of material.

An additional object of this invention is to provide a mill having nozzles each of which may be rotated so as to change the direction of the axis of the jet therefrom.

A further object of this invention is to provide a mill having a separator capable of making a more accurate selection of particle sizes.

An additional object of this invention is to provide a mill having a vane separator, preferably adjustable.

An additional object of this invention is to provide a mill having means whereby unwanted circulating material may be rapidly cleaned out of the mill.

An additional object of this invention is to provide a mill having novel means for facilitating the rapid removal of material adhering to the interior walls of the mill.

These and other objects of the invention will become apparent upon reading the following description in conjunction with the accompanying drawings in which.

Figure 1:
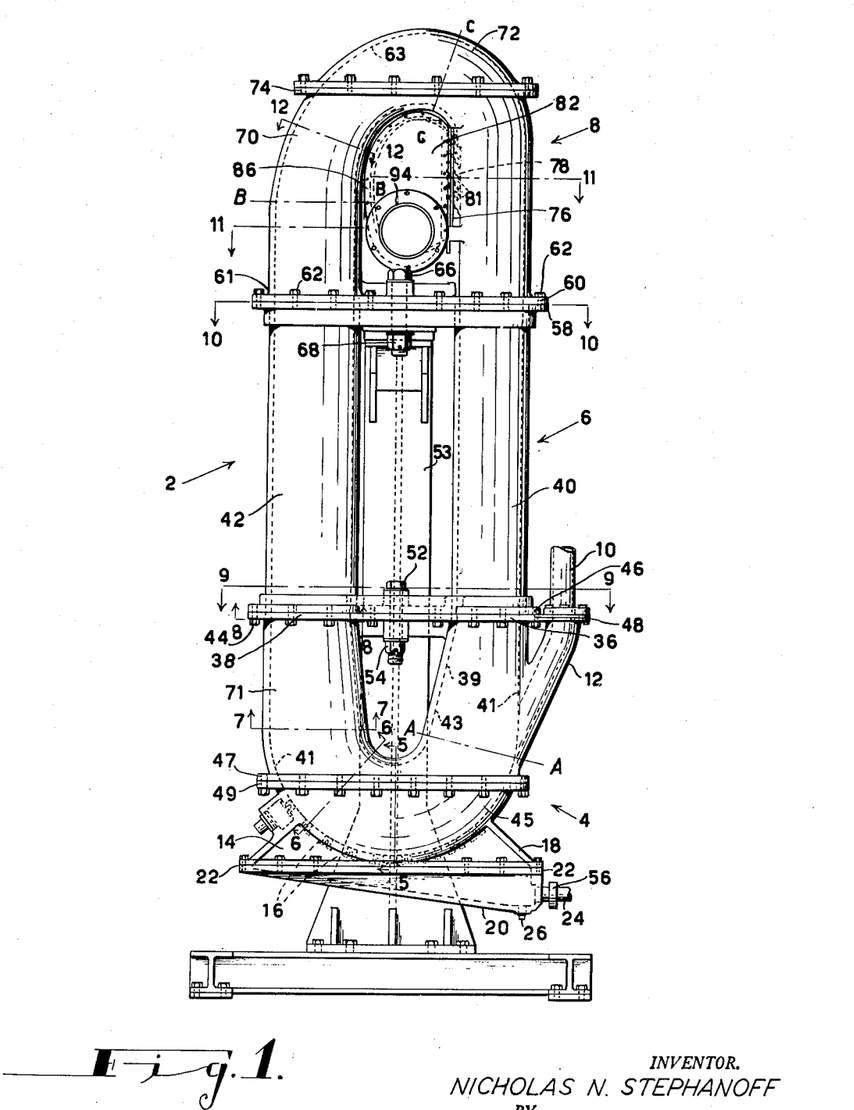
Figure 1 is a front elevation of a mill embodying the invention.
Figure 2:
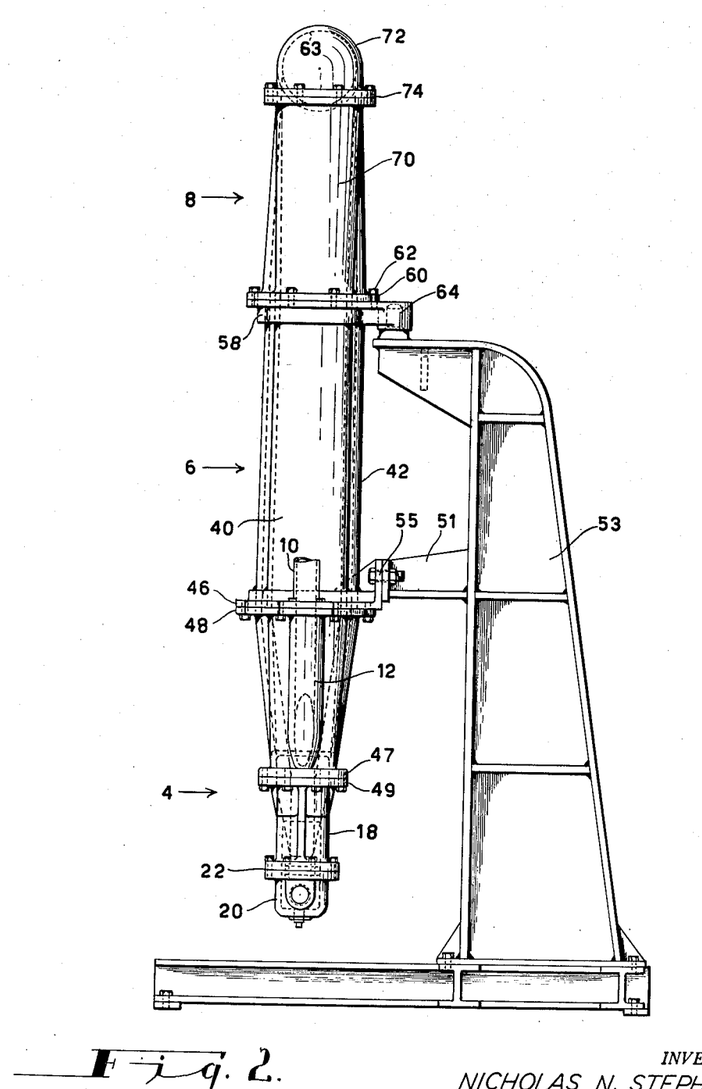
Figure 2 is a side elevation of the mill.

The mill indicated generally at 2 has a grinding chamber section 4, a stack section 6 and a classifier section 8.

A material feed pipe 10 is flanged to pipe extension 12 on the grinding chamber section. The material is preferably fed into the mill through the pipe 10 at high velocity utilizing the action of a jet as described in my prior Patent 2,325,080. Of course, the material, if it is of a free-flowing granular form, may be caused to enter under the action of gravity.

A chest 14 supplies an elastic fluid, such as air or steam, to nozzles 16. The chest is formed in two sections 18 and 20 which are flanged together at 22. A line 24 which supplies the elastic fluid is connected to section 20. This section has a drain plug 26.

Figures 3, 4, 17, 20:
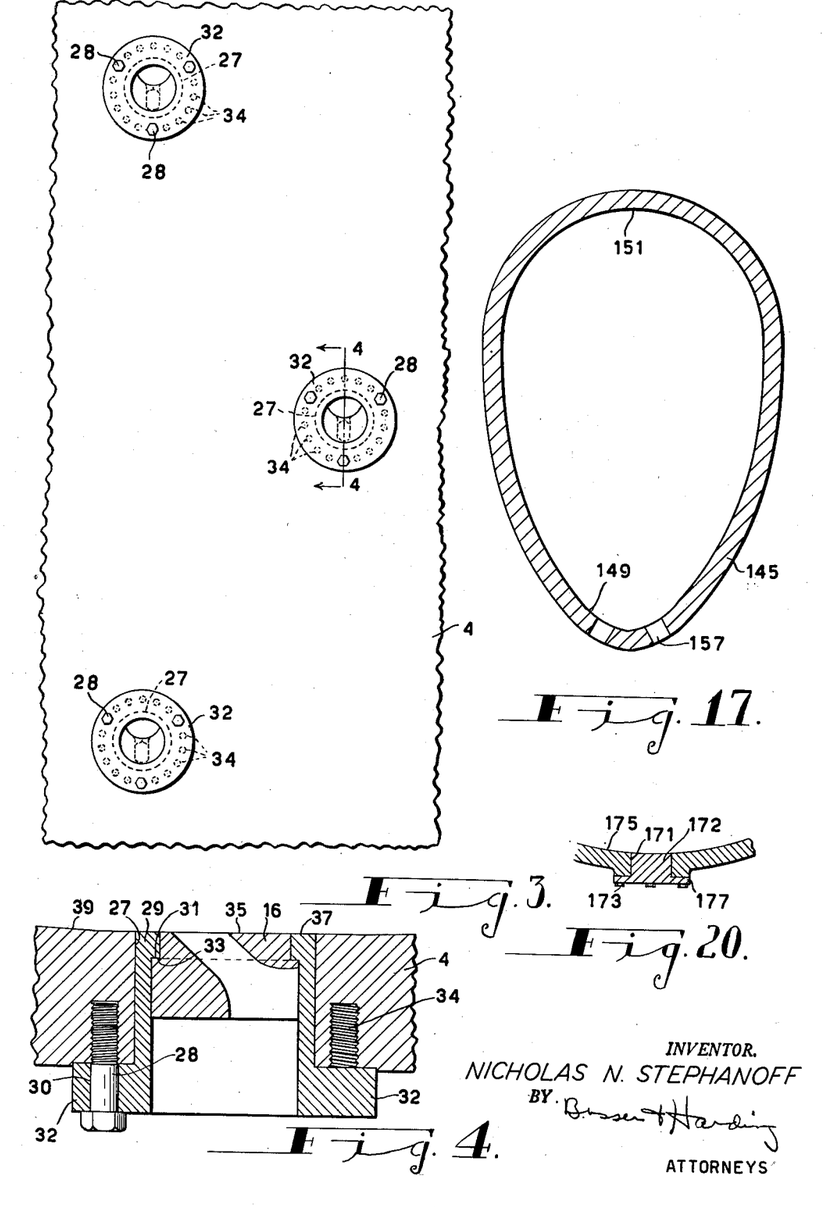
Figure 3 is a fragmentary view looking up at the bottom of a grinding chamber and showing the arrangement of the nozzles.
Figure 4 is a section taken on the plane indicated at 4—4 in Figure 3.
Figure 17 shows in cross section an alternate interior shape for a grinding chamber.
Figure 20 is a section taken on the plane indicated at 20—20 in Figure 18.

The nozzles 16 are of the abrupt type. Each nozzle 16 is secured in a sleeve 29 by a pressed fit (Fig. 4). The sleeves 29 and the nozzles 16 have abutting shoulders 31 and 33, respectively, to insure that the inner faces 35 of the nozzles will be flush with inner faces 37 of the sleeves 29 which in turn are flush with the inner surface 39 of the grinding or dispersing chamber section 4.

The sleeves 29 fit into openings 27 which are staggered alternately either side of the centerline of the grinding chamber as indicated in Figure 3. The sleeves 29 are each secured to the grinding chamber section by three bolts 28 which pass through holes 30 in sleeve flanges 32 and are received in threaded holes 34 in the grinding chamber.

A plurality of threaded holes 34 in the grinding chamber are provided for the reception of bolts 28 in order that the nozzles may be secured in numerous angularly adjusted positions. Usually the axes of flow of the nozzles will be in planes parallel to a vertical plane through the centers of the mill chambers. After removal of bolts 28 the sleeves 29 can be rotated to the right or left until any other desired nozzle position is reached with flange holes 30 aligned with a set of holes 34 whereupon they may be secured again by bolts 28.

Such selective positioning of the nozzles provides for considerable control over the amount of turbulence in the grinding chamber. Thus with the axes of flow of the nozzles in planes parallel to a vertical plane through the center of the mill chambers there will be a minimum of turbulence. By turning the nozzles so that their jets are directed towards a vertical plane through the center of the mill the turbulence can be increased since a zigzag flow will then be created. Similarly if they are turned in the opposite direction from the position illustrated, the turbulence within the mill will be increased.

The interior shape of the grinding chamber is designed to provide improved flow conditions. The interior surface 39 at the intake end 36 of the grinding or dispersing chamber and at the outlet end 38 of this chamber is circular in cross section, conforming in its respective radii to the fixed radii of the stacks 40 and 42.

From the inlet end 36 to the plane A—A the grinding chamber is gradually transformed to a substantially trapezoidal shape in cross section, the trapezoid having rounded corners. The cross section of this portion of the grinding chamber is narrow in the vicinity of outside face 41 of the grinding chamber turn and gradually widens out as it approaches inside face 43 of the grinding chamber turn. This general shape is maintained to plane 5—5 at the midportion of the grinding chamber as is illustrated in Figure 5.

Figure 5:
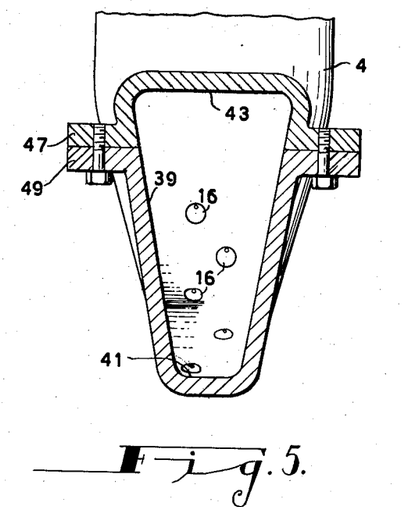
Figure 5 is a section taken on the plane indicated at 5—5 in Figure 1 to show the shape of the lowermost portion of the interior of the grinding chamber.
Figure 6:
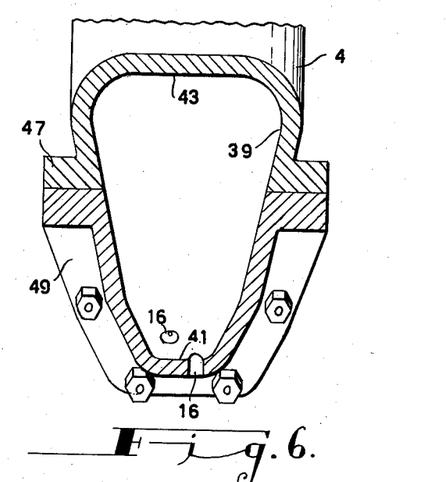
Figure 6 is a section taken on the plane indicated at 6—6 in Figure 1 to shown the shape of the interior of the grinding chamber further along in the direction of progress of the material.
Figure 7:
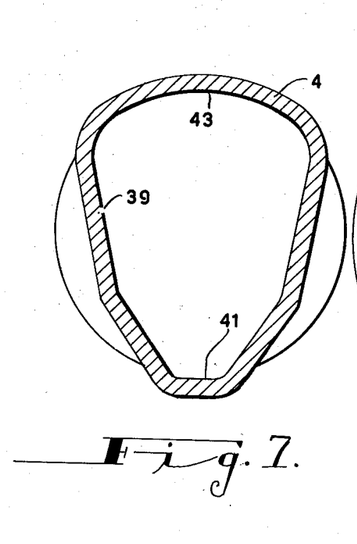
Figure 7 is a section taken on the plane indicated at 7—7 in Figure 1 to show the shape of the interior of the grinding chamber still further along in the direction of flow.
Figure 8:
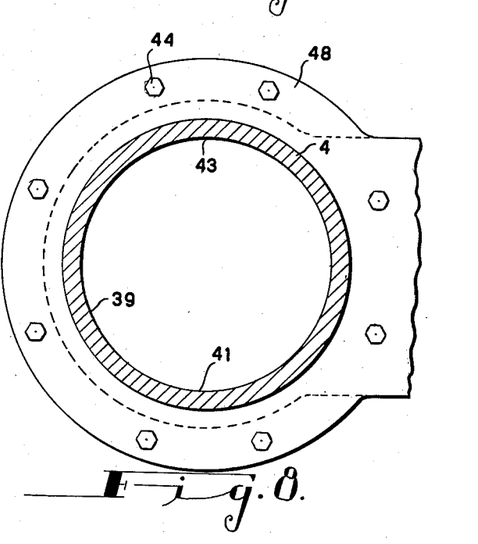
Figure 8 is a section taken on the plane indicated at 8—8 in Figure 1 to show the shape of the interior of the grinding chamber adjacent to its junction to the upflow stack.

From plane 5—5 to the outlet end 38, the grinding chamber in cross section gradually develops from the substantially trapezoidal shape shown in Figure 5 to a circular shape, as illustrated in the successive sections of Figures 6, 7 and 8. The cross sectional area gradually increases during the transformation to the circular shape, the rate and amount of increase corresponding to the rate at which fluid is added to the flow by the nozzles 16. As illustrated, in the vicinity of the outside face 41, the grinding chamber remains narrower than it is in the vicinity of the inside face 43 during the shape transformation.

By providing the grinding chamber with a large cross sectional area in the vicinity of the inside of the turn, gradually decreasing to a smaller cross sectional area in the vicinity of the outside of the turn where the nozzles are located, the efficiency of the nozzles is increased for varying conditions of material flow since, when a less than normal amount of material is circulating, it will be impelled by centrifugal force into the small cross sectional area near the nozzles and hence will be well concentrated for action by the nozzles. It will be obvious that the tapered shape of the grinding chamber provides for a substantially constant concentration of material in the jet region within wide limits of the quantity of material circulating.

By enlarging the cross sectional area from the midportion of the grinding chamber at the plane 5—5 to the outlet 38, it is possible to prevent the inflowing jets from crowding the circulating material against the walls of the chamber. This results in a marked decrease in the wear of the chamber walls, the shape of the chamber conforming generally to the bloom of the nozzle jets.

In the grinding chamber, both small particles and large particles of the material will be subject to both drag of the elastic fluid and centrifugal forces. However, since the ratio of surface area to volume is greater for smaller particles than for larger ones, the drag force on the smaller particles will generally overshadow the centrifugal force thereon so that the smaller particles will follow the flow lines of the elastic fluid, departing from them only slightly due to centrifugal forces. On the other hand, the larger particles will be thrown centrifugally outward to the outer zone of the grinding chamber into the vicinity of emergence of jets from the nozzles. The separation thus attained, while by no means complete, selectively keeps the major amount of the smaller particles adjacent to the inside of the turn and so avoids such concentration of the smaller particles as will tend to cause them to load the jets and hence decrease the grinding action on the larger particles. In other words, the smaller particles will tend to pass through the grinding chamber with less grinding action thereon than the larger particles. The shape of the grinding chamber promotes this segregation, the larger particles being concentrated in the narrow outside region into which the nozzles discharge.

The grinding chamber 4 is formed by section 71 and a section 45 having flanges 47 and 49, respectively, which are bolted together.

The grinding chamber 4 is secured to the stack section 6 by bolts 44 in flanges 46 and 48. Flange 46 on the stack section is bolted at 55 to bracket 51 on the mill support 53. A bolt 52 passes through the center of flanges 46 and 48 and is secured by a nut 54.

Removal of bolts 44, disconnection of pipe 10 from pipe 12, and disconnection of line 24 at coupling 56 permits the grinding chamber to be rotated on the bolt 52. This greatly facilitates cleaning and inspection of the grinding chamber by providing direct access thereto.

Figure 9:
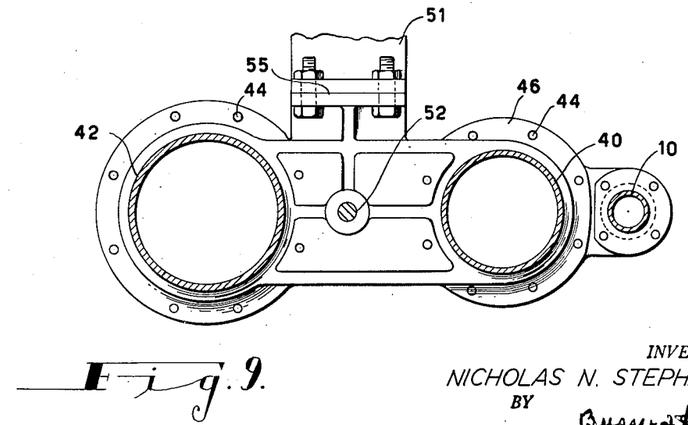
Figure 9 is a section taken on the plane indicated at 9—9 in Figure 1.

The stack section 6 connects the grinding chamber to the classifier section 8. Stacks 40 and 42 are of uniform circular cross sectional shape conforming to the inlet end 36 and outlet end 38 of the grinding chamber, respectively. Stack 42 has a larger cross sectional area than stack 40 as shown in Figures 1, 2 and 9.

Stack section flange 58 is secured to classifier section flange 60 by bolts 62. Flange 58 is removably secured to support 53 at 64. A bolt 66 passes through the center of flanges 58 and 60 and is secured by a nut 68. Removal of bolts 62 permits the classifier section to rotate around the bolt 66. This rotation provides access to the interior of the classifier section and stack section.

Figure 10:
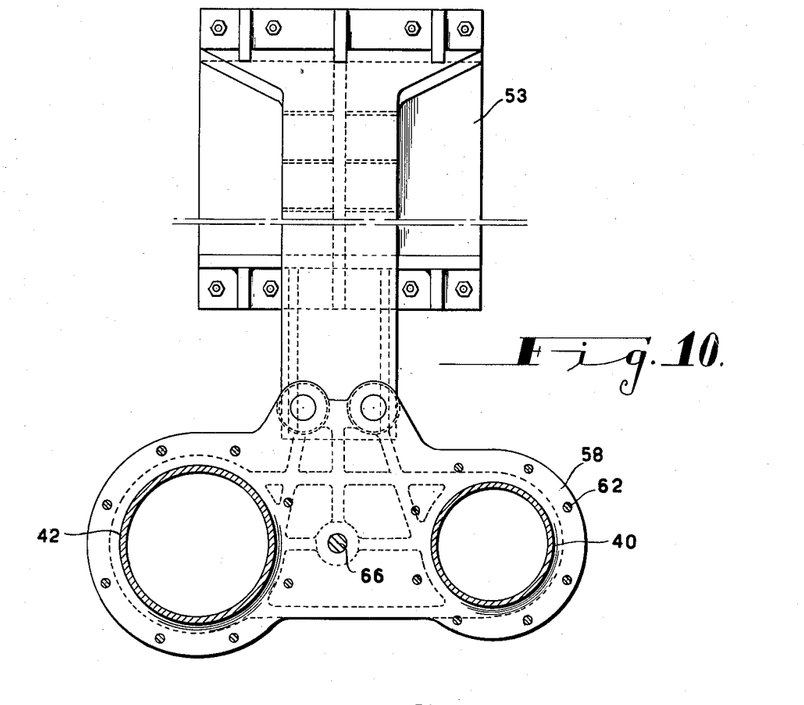
Figure 10 is a section taken on the plane indicated at 10—10 in Figure 1.
Figure 12:
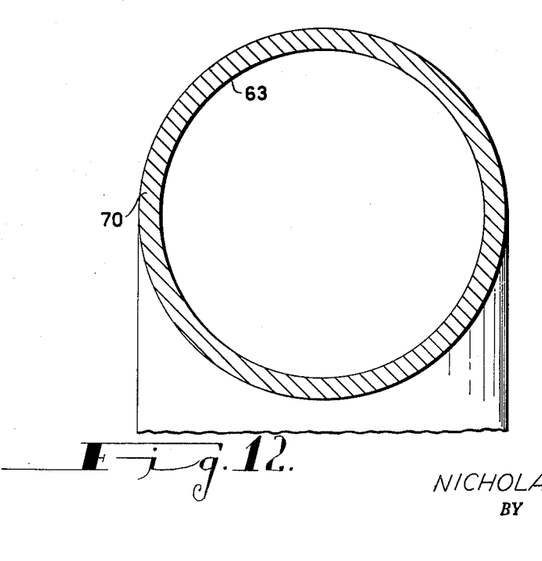
Figure 12 is a section taken on the plane indicated at 12—12 in Figure 1 to show the shape of the interior of the classifier section.

The classifier section has at its inlet end 61 a circular cross sectional shape corresponding to that of stack 42 as shown in Figure 10. This shape is maintained between the inlet end and the plane indicated by the plane B—B. Between the planes indicated at B—B and C—C the shape of the interior surface 63 of the classifier may be considered developed by drawing two involute curves in a perpendicular plane passing through the center of the stacks with their radii of curvature decreasing in the direction of progress of the material. This portion of the classifier section has circular cross sections (Fig. 12) having diameters determined by the distances along approximate normals to the center line between the exterior and interior involutes between the two involute curves. The result is a gradually increasing curvature of the passage and a gradually decreasing cross sectional area thereof. From the plane indicated at C—C, the curvature of the turn may remain fixed until the end of the 180° turn. The cross sectional area remains fixed from the plane indicated at C—C down to the stack 49.

The gradually increasing turn between the planes indicated at B—B and C—C together with the gradually decreasing cross-sectional area eliminates bunching of the circulating material and improves the stratification of the particles by providing for the gradual acceleration of material particles and fluid together. Heretofore, due to the sudden increase in velocity in the classifier section and the sudden transition from straight line to curved flow, the larger particles of material lagged behind the fluid flow and bunched. Further, by providing for acceleration of the circulating material in the turn and by increasing the turn gradually in place of suddenly, the number of material particles striking the surfaces on the outside of the turn has been very greatly reduced and hence the rate of wear of these surfaces has been markedly reduced. This classifier section, due to its superior smooth non-turbulent flow conditions, results in better stratification of the particles, and, consequently, more complete separation. It will, of course, be evident that it is not specifically necessary that the curves generating the interior and exterior of the classifier section should be involute curves so long as they are curves of decreasing radius of curvature in the direction of progress of the flow.

What is desired is a gradual deviation of the flow from the straight line flow of the stack to a reasonably small radius of curvature so that centrifugal separation will be effected without the occurrence of undue turbulence. Similarly, the linear velocity is increased with resultant increase of centrifugal separating effect.

The classifier section has two portions 70 and 72 which are flanged together at 74. The interior surface 63 of the classifier section 8 wears more rapidly in portion 72 than in portion 70. The useful life of the portion 70 is increased by the provision for replacement of the portion 72.

Figure 11:
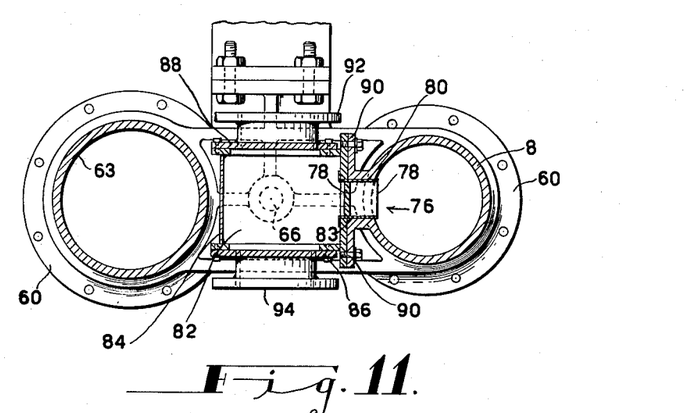
Figure 11 is a section taken on the broken surface indicated at 11—11 in Figure 1.

As shown in Figures 1 and 11, in place of the customary classifier outlet, there is a separator 76 having vanes 78 fixed in a casing 80. The vanes 78 slant downwardly and project slightly into the classifier section. The passages 81 formed in casing 80 by the vanes lead to a chamber 82, which is formed by walls 84, 86 and 88 which are flanged together. Wall 84 is bolted to the classifier section at 90. Outlets 92 and 94 are provided for selective connection either at the front or back of the mill to a stack leading to a conventional collector unit (not shown). A blank plate (not shown) may cover the outlet which is not utilized.

Figure 13:
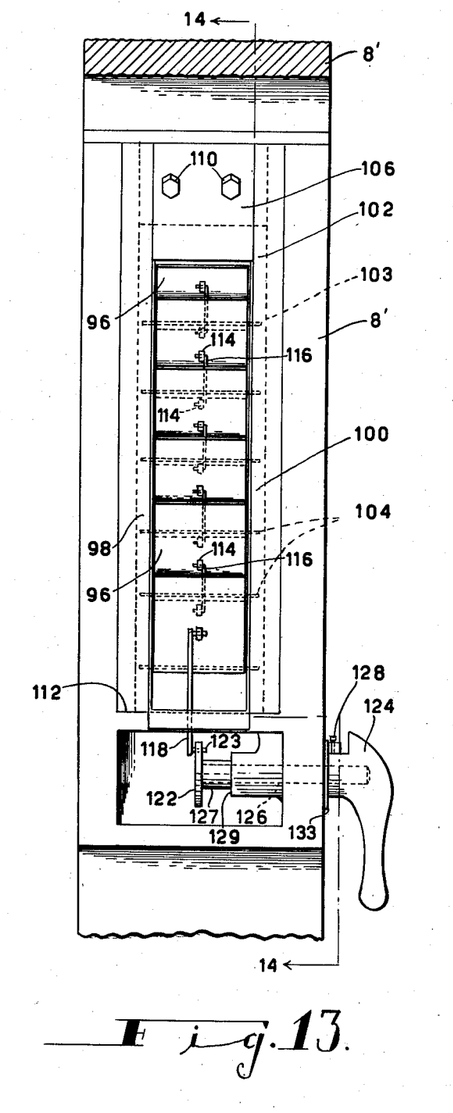
Figure 13 is a fragmentary view showing an adjustable vane separator.
Figure 14:
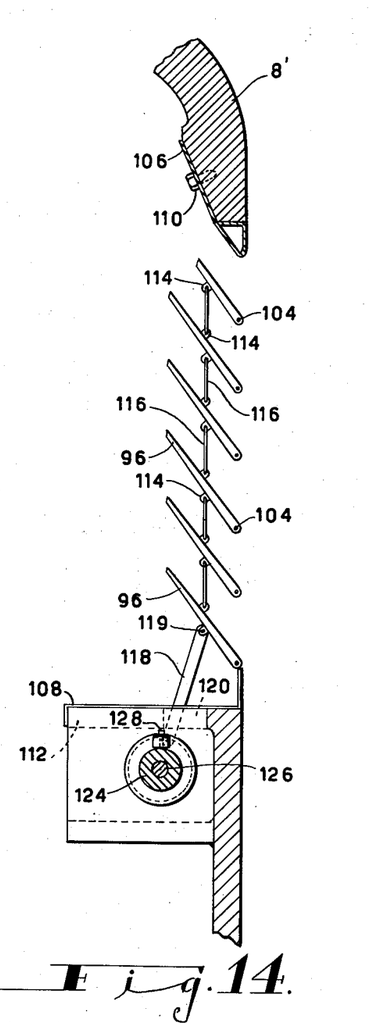
Figure 14 is a section taken on the broken surface indicated at 14—14 in Figure 13.

Casing 80 is held in a passage 83 formed in wall 84 and the classifier section 8.

Where it is desired to regulate the fineness of the particles separated, a separator may be used having vanes whose angle to the direction of approach flow can be adjusted. Such a separator is shown in Figures 13 and 14. The vanes 96 are pivotally secured to the side walls 98 and 100 of casing 102 by rods 104. The casing 102 rests in opening 103 in the classifier section 8' and has a top wall 106 and a bottom wall 108. The top wall 106 is bolted to classifier section 8' by bolts 110 and the bottom wall rests on a shelf 112.

Ears 114 secured to vanes 96 provide for connection of the adjacent vanes by links 116 which are pivotally held in the ears. A link 118 is pivotally connected to the ear 114 on the underside of the lowest vane at 119. Link 118 passes through an aperture 120 in shelf 112 and is pivotally secured to wheel 122 by pin 123. Wheel 122 may be rotated by movement of handle 124 on shaft 126. The wheel 122 is held in a fixed lateral position by an extended hub 127 which abuts against bearing 129 which holds shaft 126 and the handle 124 bearing against washer 133. Handle 124 may be locked in position by a set screw 128 or any other conventional locking means.

Rotating handle 124 causes the wheel 122 to raise or lower at will the link 118 which in turn pivots the vanes 96 on rods 104 causing them to vary their angle with respect to the direction of approach flow. As shown in Figure 14, the vanes are placed at their maximum angle to the horizontal. This will provide for the separation of only the finest particles. As the angle is decreased, coarser particles will be separated out of the mill. For the separation of very large particles, the vanes may be adjusted so as to slope downwardly from the mill.

The use of vanes either of the stationary or adjustable type insures that all portions of the outflowing fluid are subjected to substantially the same flow conditions, i. e., deviation through about the same radius of curvature. Thus, in all parts of the outflow, particles carried by it are subjected to substantially the same centrifugal effect with resulting uniformity of the emerging finely ground product.

Aside from the convenience of being able to control within wide limits the size of the particles separated, a separator having vanes provides for separation of particles of very consistent size due to the uniformity and smoothness of the flow conditions at the points of separation. Heretofore, an unobstructed opening to a reverse stack has been used. At or near the top of the opening, the flow conditions and separation were excellent. However, the flow conditions in the middle and in the lower portion of the opening differed from the conditions near the top and resulted in a wide dispersion in the size of the particles selected.

Figure 15:
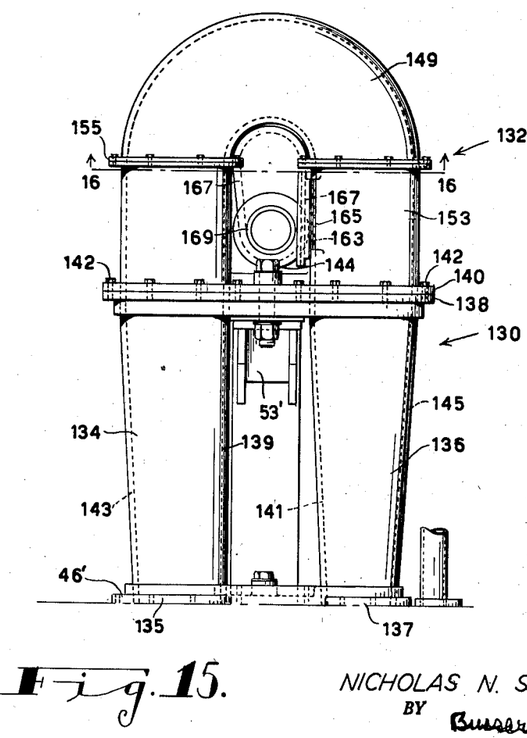
Figure 15 is a front elevation of an alternative form of the upper portion of a mill.
Figure 16:
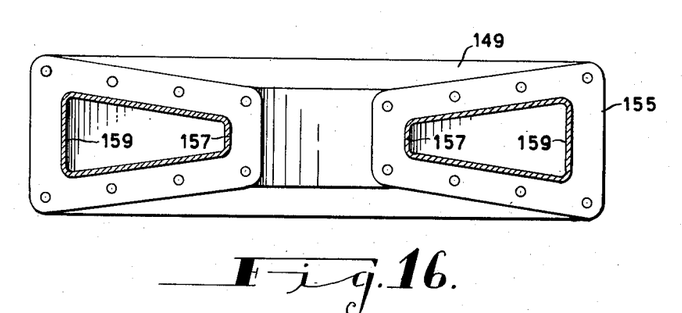
Figure 16 is a section taken on the plane indicated at 16—16 in Figure 15.

In Figures 15 and 16 are shown a modified stack section 130 and classifier section 132. Stacks 134 and 136 have at their lower extremity circular cross sections conforming in size to those of stacks 40 and 42 and a flange 46' identical with flange 46 and which may be similarly flanged to grinding chamber 4. From their circular shapes at their lower extremities 135 and 137, both stacks 134 and 136 are gradually transformed to identical cross sectional shapes which are substantially trapezoidal, the sides 139 and 141, respectively, being relatively narrow and the sides 143 and 145, respectively, being relatively wide.

The stack section 130 is flanged to the classifier section 132 by flanges 138 and 140 and bolts 142. A bolt 144 through the center of the flanges permits pivoting of the classifier section in the same fashion that bolt 68 permits classifier section 8 to pivot. Flange 138 is secured to a support 53'.

The classifier section 132 comprises a turn portion 149 and a straight portion 153 which are flanged together at 155.

The classifier section 132 has a fixed cross section throughout which is, as shown in Figure 11, substantially trapezoidal conforming to the shape of the stacks. The larger width of the trapezoid is on the outside 159 of the turn and the small width on the inside 157 of the turn.

Such construction by providing a larger width in cross section on the outside of the turn than on the inside of the turn, provides for a more accurate separation of fine particles by making more room for the large particles which prevents their being forced into the concentration of fine particles on the inside of the turn and in the area where they would be separated from the mill. Similarly this construction prevents excessive wearing of the surfaces on the outside of the turn by eliminating packing and crowding of the particles against a small area of the outside of the curve.

The classifier section has an outlet similar to that shown in Figures 1 and 11. A separator 161 has fixed vanes 163 which slant downwardly and project slightly into the classifier section. Passages 165 formed by the vanes 163 lead to a chamber 167 which has a flanged outlet 169 which may be connected to a stack leading to a conventional collector unit (not shown).

It should be noted that the grinding or dispersing chamber within the scope of this invention may assume a wide variation of shapes in cross section so long as they are relatively narrow at the outside of the curve and broaden out as the inside of the curve is approached. Thus, for example, as shown in Figure 17, a cross section of a grinding chamber 145 within the scope of this invention can be substantially sewer-like in shape being relatively narrow in cross section in the vicinity of the outside turn portion 149 and widening gradually to a relatively wide width in the vicinity of the inside turn portion 151. Openings 157 are provided for the reception of nozzles which may be of the type previously described and hence are not shown.

A modified mill 150 (shown in Figs. 18 and 19) has a grinding or dispersing chamber section 152, a stack section 154 and a classifier section 156. The grinding chamber section of this mill has interior cross sectional areas which are substantially the same as those of the grinding chamber of the mill shown in Figures 1 and 2.

Figure 18:
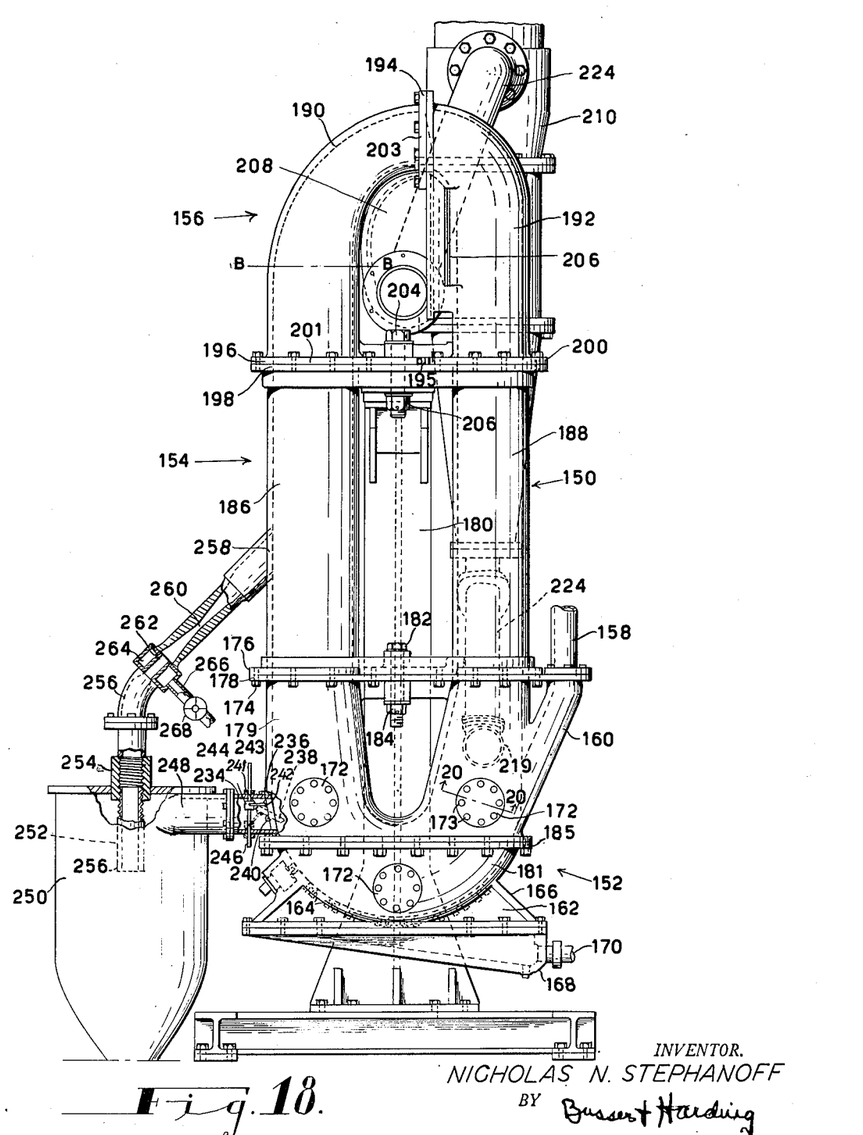
Figure 18 is a front elevation of a modified mill showing cleaning-out means and a feedback from a separator.
Figure 19:
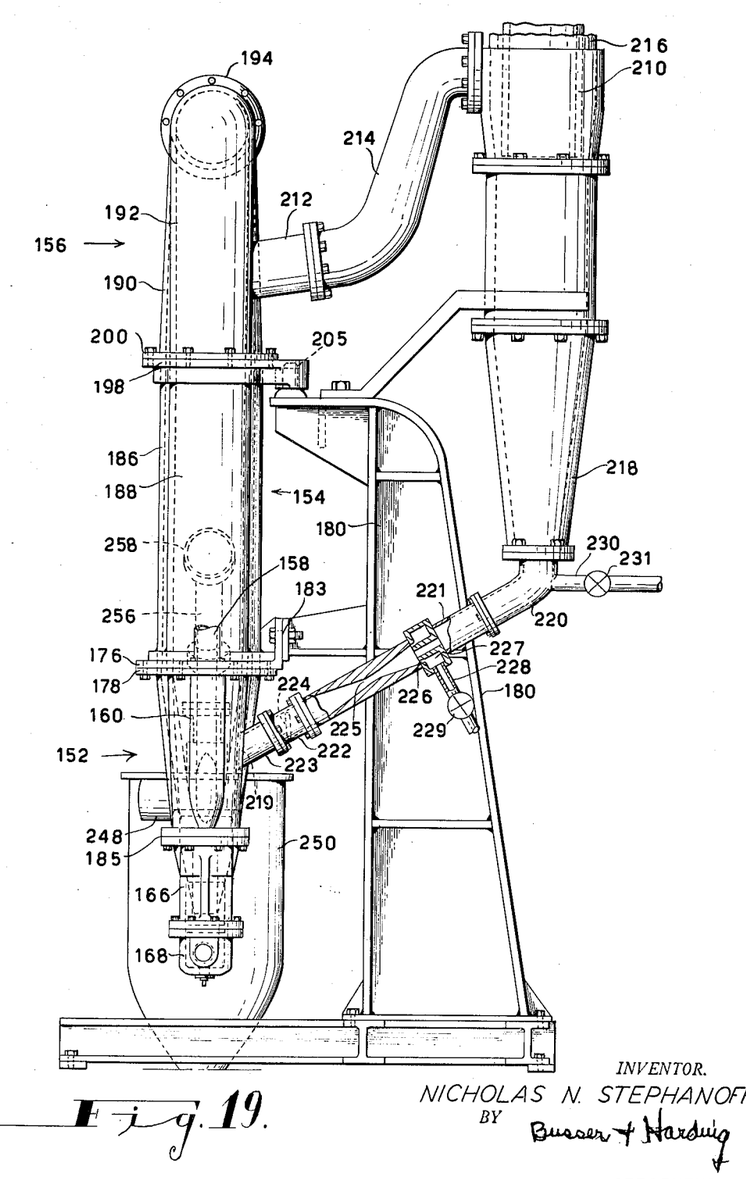
Figure 19 is a side elevation of the mill of Figure 18.

A material feed pipe 158 is flanged to pipe extension 160 on the grinding chamber section, and into this the material is fed at high velocity as previously described. A chest 162 supplies an elastic fluid to nozzles 164, which are preferably of the abrupt type. The chest is formed in two sections, 166 and 168, which are flanged together. A fluid line 170 is secured to section 168.

The grinding chamber 152 has hand holes 171 with plugs 172. These plugs 172 are made so that their interior faces conform to the interior surface 175 of the grinding chamber as shown in Figure 20. The plugs are secured to the mill by bolts 173 in flanges 177. It will be apparent that, by removal of the plugs 172, access to the interior of the grinding chamber is provided. This access is of particular value in the cleaning of the interior surfaces of the mill. By hammering the exterior surfaces of the mill, it is possible in most cases to loosen considerable crust from the interior surfaces of the mill. When loosened, this crust will be deposited in the lower portion of the grinding chamber and may be removed by hand by means of the access provided by the plugs 172. In addition, it will be made apparent later that these plugs provide desirable access to various openings in the grinding chamber.

The grinding chamber has two sections 179 and 181 which are flanged together at 185.

The grinding chamber 152 is secured to the stack section 154 by bolts 174 in flanges 176 and 178. Flange 176 is bolted to the mill support 180 at 183. A bolt 182 passes through the center of these flanges and is secured by a nut 184. The stack section 154 connects the grinding chamber to the classifier section 156. Stacks 186 and 188 are of uniform circular cross sectional shape, stack 186 having a larger cross sectional area than stack 188.

Classifier section 156 is formed by sections 190 and 192 which are flanged together at 194 and 195. Section 190 has a flange 196 which is bolted to flange 198 on the stack section 154. Similarly, section 192 has a flange 200 which is bolted to flange 198 on the stack section. Flange 198 is removably secured to support 180 at 205. A bolt 204 passes through flanges 196 and 198 and is secured by a nut 206 to permit rotating the classifier section 156 in a manner similar to the rotation of classifier section 8.

Section 190 has at its inlet end 201 a circular cross sectional shape corresponding to that of stack 186. This shape is maintained between the inlet end and the plane indicated by the line B—B. Between the plane indicated by the line B—B and the outlet end 203, the shape of the interior of the section 190 is developed by drawing two involute curves in a perpendicular plane passing through the center of the stacks as described heretofore, the distance between these curves being used to determine the diameters of circular cross sections. This results in a gradually increasing curvature and a gradually decreasing cross sectional area. Section 192 has a fixed curvature from its inlet end where it is flanged to the section 190 at 194 to the point where the classifier section turn of 180° has been completed. The circular cross section of the section 192 remains fixed and, of course, corresponds to the cross section of section 190 at the outlet end 203.

It will be readily apparent that section 190 may with facility be replaced. This is a considerable advantage since the upper portion of this section wears more rapidly than other portions of the classifier section. Further, it is very advantageous to be able to change the curvature of the classifier section turn. Depending on the material being treated and the results which it is desired to obtain, it is sometimes desirable to have a turn of gradually increasing curvature, while in other cases, a relatively abrupt turn is desired. These variations have heretofore been achieved by replacing the complete classifier section whereas now they may be achieved by merely replacing section 190.

The classifier section has an outlet 206 leading to a chamber 208. A collector 210 is connected to the chamber 208 by pipes 212 and 214. The collector 210 is of a conventional centrifugal gravity type in which the material to be retained is exhausted through a pipe 216 leading from the upper portion of the collector while the material rejected falls into the lower portion 218 of the collector. The lower portion 218 is connected to the opening 219 in the rear of the grinding chamber by means of pipes 220, 221, 222 and 223 which are flanged together.

Pipe 222 has a check valve 224. Pipe 221 has a Venturi passage 225 and jets emerging from annularly arranged nozzles 226 fed from an elastic fluid chest 227 which receives its fluid from pipe 228 controlled by valve 229. An air supply pipe 230 is connected to pipe 220. Pipe 230 leads from the atmosphere and has a control valve 231.

The opening 219 is at a point of negative pressure with respect to the mill. When valves 229 and 231 are both closed, the material flows from the collector downwardly through pipes 220, 221, 222 and 223 into the grinding chamber by gravity. Should the flow within the mill become disturbed to produce a positive pressure at the opening 219, the check valve 224 will prevent material from being forced back into the collector.

When the negative pressure at the opening 219 is so small that the flow of material from the collector to the mill is sluggish, the valve 229 may be opened so as to provide an elastic fluid to the nozzles 226 and a resultant ejector action. When the ejector action as controlled by valve 229 is increased to the point where it commences to affect adversely the operation of the collector 210, valve 231 may be opened permitting air to be drawn into pipe 220. The air thus supplied from the atmosphere prevents the ejector action of the jets from returning to the mill particles which have been satisfactorily ground and which should be separated out by the collector.

This feed-back system from the separator provides reintroduction into the mill of material particles which were withdrawn from the mill before they had been properly comminuted. Sometimes, despite all efforts at prevention, such particles which have not been completely treated pass from the mill. Their rapid return is very advantageous in that it helps to keep a larger load circulating in the mill, thereby resulting in a more intensive grinding. Further, the percentage of acceptably treated particles achieved in a single continuous operation is considerably increased.

A pipe 234 leads out from an opening 236 in the grinding chamber section 152. A butterfly valve 238 is fitted in the opening 236 and is pivoted at 240 to the grinding chamber section. A link 241 is pivotally secured to the valve 238 at 242 and is pivotally secured at 243 to a block 244 which is fixedly secured to rod 246. The rod 246 is movably supported by pipe 234. It will be apparent that the valve 238 may be opened or closed by the movement of rod 246 and its associated mechanism.

The pipe 234 is flanged to pipe 248 which leads tangentially into collector 250, which is a conventional centrifugal gravity type collector. The collector has an exhaust pipe 252 which is threaded to the interior of pipe 254 so that its lower end 256 may be raised or lowered thereby determining the fineness of the particles to be exhausted from the collector. The pipe 254 is flanged to pipe 256 which is connected to the stack section 186 at 258. The pipe 256 has a Venturi passage 260 and jets emerging from annularly arranged nozzles 262 fed from an elastic fluid chest 264 which receives its fluid from connection 266 controlled by a valve 268.

In order to free the mill of unwanted waste circulating material such as, for example, slag, the feeding of material to the mill is stopped and a sufficient time is permitted to lapse in order that the bulk of the desired material may be comminuted and exhausted from the mill. At this point the valve 238 which is normally in the closed position is opened. A portion of the valve projects into the interior of the grinding chamber and acts as a scoop to catch the heavy waste materals such as slag, permitting most of the light material remaining in the mill to remain circulating within the mill. The material thus diverted by the valve 238 into pipes 234 and 242 passes into the collector 250. Here the heavy unwanted waste material falls to the bottom of the collector while any of the lighter material which it is desirable to retain is exhausted through pipe 252. As explained above, the position of the pipe 252 may be regulated in order to determine what particles will be returned to the mill. Particles exhausted through pipe 252 pass through pipe 254 into pipe 256 where they are accelerated by the nozzles 262, pass through the Venturi passage 260 and thence pass into the stack section 186. The Venturi passage 260 provides for some additional grinding of the material particles passing therethrough.

The elastic fluid used is a matter of choice depending upon the material being treated and the results desired. Usually air or steam is desirable for grinding, but certain materials which may be easily oxidized or otherwise affected may be ground through the use of inert gas as the elastic fluid. If inert gas is used, the system may be closed so that the gas may be recovered and recompressed, with possible reheating, for continuous separation. While grinding has been primarily stressed in connection with the separation, drying or other chemical treatments may be involved as described in my prior patents referred to above.

In general, for grinding, drying or other treatment, it is desirable that the nozzles should be of a type, and the pressure drops through them of such magnitude, that the jets will attain at least the acoustic velocity at the temperature and pressure of the elastic fluid passing therethrough. This, of course, is achieved by conventionally properly formed nozzles and utilization of at least a critical pressure drop.

When it is desired to have super acoustic velocities in the mill, a nozzle of the De Laval smooth flow type having a convergent passageway leading to a throat and a divergent discharge passageway can be used in place of the abrupt type of nozzle. De Laval nozzles have been unsatisfactory for use when grinding heretofore since the circulating material was unable to enter the jet near the nozzle. When, however, they are used in a mill embodying this invention, the circulating material is forced into the jets near the nozzles due to the shape of the grinding chamber. The great centrifugal force developed incident to the use of super acoustic velocities is sufficient to cause the material particles to penetrate the jet of a De Laval nozzle if, as in the invention, the material particles are confined to the region near the emerging jets when they are forced to the outside of the grinding chamber.

From the foregoing, it will be evident that the invention provides various improvements leading to the production of finer ground products, more uniform products and, in particular, in accordance with the modification of Figures 18 and 19, to the possibility of beneficiation of such materials as ores. The increase of efficiency of the mill in effecting more and finer grinding for a given introduction of energy in the elastic fluid is attained by reason of the cross-sectional shape of the grinding or dispersing chamber and the possibility of adjustment of the nozzles in accordance with the material which is undergoing treatment.

Greater uniformity of the product is achieved by the improvement in the separation effected by reason of the design of the curvature of the classifying section of the mill and by the utilization of the separating vanes to secure uniformity of outflow of the elastic fluid containing the fine particles. By the adjustment of the outflow vanes, a wide range of selection may be secured in the emerging particle size.

Beneficiation is achieved through the possibility of bleeding-out accumulated material with separation and return to the mill.

It will be evident that numerous variations of the embodiment of the principles heretofore set forth may be used without departing from the scope of the invention as defined by the following claims.

What I claim and desire to protect by Letters Patent is:

1. Apparatus for the treatment of material in comminuted form in suspension in elastic fluid comprising an endless casing having a curved grinding chamber section, a stack section, said grinding chamber section having a flange which is bolted to a corresponding flange in the stack section, a bolt passing through said flanges forming an axis about which the grinding chamber section may be rotated, a curved classifier section having a flange which is bolted to a corresponding flange on the stack section, a bolt through the classifier section flange and the corresponding stack section flange providing an axis about which the classifier section may be rotated, means for supporting the stack section, means to admit raw material into the casing, means to admit an elastic fluid to provide high velocity jets in the casing and an exhaust passage.

2. Apparatus for the treatment of material in comminuted form in suspension in elastic fluid comprising an endless casing having a grinding chamber in the form of a tubular turn, an exhaust port located on the outside of the grinding chamber turn for the withdrawal of unwanted waste circulating material, a valve in said exhaust port, a passage connecting said exhaust port to a centrifugal gravity collector having an exhaust pipe for the discharge of fine particles not retained by the collector, a passage connecting said collector exhaust pipe to the casing, means to admit raw material into the casing, means to admit an elastic fluid to provide high velocity jets in the casing and an exhaust passage.

3. Apparatus for the treatment of material in comminuted form in suspension in elastic fluid comprising an endless casing having a grinding chamber in the form of a tubular turn, an exhaust port located on the outside of the grinding chamber turn for the withdrawal of unwanted waste circulating material, a valve in said exhaust port, a passage connecting said exhaust port to a centrifugal gravity type collector having an exhaust pipe for the discharge of fine particles not retained by the collector, a passage connecting said collector exhaust pipe to the casing, said passage having peripherally arranged through which an elastic fluid is fed to provide high velocity jets, means to admit raw material into the casing, means to admit an elastic fluid to provide high velocity jets in the casing and an exhaust passage.

4. Apparatus for the treatment of material in comminuted form in suspension in elastic fluid comprising an endless casing having a grinding chamber with a turn, an exhaust port located on the outside of the grinding chamber therein for the withdrawal of unwanted waste circulating material, a valve in said exhaust port, a passage connecting said exhaust port and the upper portion of a centrifugal gravity collector having a substantially vertical exhaust pipe with an opening located substantially below the top of the collector for the discharge of fine particles not retained by the collector, means for adjusting the distance of said pipe opening from the top of the collector, a passage connecting the collector exhaust pipe to the casing, means to admit raw material into the casing, means to admit an elastic fluid to provide high velocity jets in the casing and an exhaust passage.

5. Apparatus for the treatment of material in comminuted form in suspension in elastic fluid comprising an endless casing having a grinding chamber with a turn, an exhaust port located on the outside turn of the grinding chamber for the withdrawal of unwanted waste circulating material, a valve in said exhaust port, a passage connecting said exhaust port and the upper portion of a centrifugal gravity collector having a substantially vertical exhaust pipe with an opening located substantially below the top of the collector for the discharge of fine particles not retained by the collector, means for adjusting the distance of said pipe opening from the top of the collector, a passage connecting the collector exhaust pipe to the casing, said passage having peripherally arranged nozzles through which an elastic fluid is fed to provide high velocity jets and having beyond said nozzles in the direction of flow a portion forming a venturi, means to admit raw material into the casing, means to admit an elastic fluid to provide high velocity jets in the casing and an exhaust passage.

6. Apparatus for the treatment of material in comminuted form in suspension in elastic fluid comprising an endless tubular casing including a portion forming a grinding chamber and a portion forming a classifier, the latter receiving suspension from the grinding chamber and returning suspension to the grinding chamber, means for exhausting elastic fluid containing fine particles from the classifier, said means comprising a passage and substantially parallel spaced vanes located in the vicinity of junction of the passage with the classifier, said vanes being directed at angles with reference to the adjacent portion of the classifier such that material flowing from the classifier to the passage through the spaces between the vanes must undergo a change of direction in excess of ninety degrees in passing from the classifier to the spaces between the vanes, means for directing high velocity jets of elastic fluid into said grinding chamber, and means for admitting raw material into the casing.

7. Apparatus for the treatment of material in comminuted form in suspension in elastic fluid comprising an endless tubular casing including a portion forming a grinding chamber and a portion forming a classifier, the latter receiving suspension from the grinding chamber and returning suspension to the grinding chamber, means for exhausting elastic fluid containing fine particles from the classifier, said means comprising a passage and angularly adjustable, substantially parallel spaced vanes located in the vicinity of junction of the passage with the classifier, said vanes being directed at angles with reference to the adjacent portion of the classifier such that material flowing from the classifier to the passage through the spaces between the vanes must undergo a change of direction in excess of ninety degrees in passing from the classifier to the spaces between the vanes, means for directing high velocity jets of elastic fluid into said grinding chamber, and means for admitting raw material into the casing.

8. Apparatus for the treatment of material in comminuted form in suspension in elastic fluid comprising an endless casing having a grinding chamber with a turn portion, nozzles located on the outside of the turn of said portion, said nozzles being rotatably mounted in said casing, each nozzle being provided with an elastic fluid passage forming an angle with respect to the axis about which the nozzle is rotatably mounted so that by rotation of the nozzle the relative directions of the jets issuing therefrom into the grinding chamber may be varied, means to supply an elastic fluid at high pressure to said nozzles to provide high velocity jets, said grinding chamber having in the region of the nozzles a shape in cross section which is substantially narrower on the outside of the turn than on the inside of the turn, so that material in suspension is centrifugally concentrated in the region of emission of the jets, means to admit raw material into the casing and an exhaust passage from said casing.

9. Apparatus for the treatment of material in comminuted form in suspension in elastic fluid comprising an endless casing having a grinding chamber with a turn portion, nozzles located on the outside of the turn and in the portion of maximum radius of said turn portion, means to supply an elastic fluid at high pressure to said nozzles to provide high velocity jets, said grinding chamber having in the region of the nozzles a shape in cross section diverging outwardly from the nozzles in the direction of the bloom of the jets so that material in suspension is centrifugally concentrated in the region of emission of the jets and forced into the jets in the region of their emission, means to admit raw material into said casing and an exhaust passage from said casing.

10.